US010016841B2

(12) United States Patent
Hisada et al.

(10) Patent No.: US 10,016,841 B2
(45) Date of Patent: Jul. 10, 2018

(54) LASER SURFACE TREATMENT METHOD AND LASER SURFACE TREATMENT APPARATUS WITH RADIATING THE SURFACE TO BE TREATED ALONG AN ACUTE ANGLE

(71) Applicant: TOYOTA JIDOSHA KABUSHIKI KAISHA, Toyota-shi (JP)

(72) Inventors: Kohei Hisada, Nisshin (JP); Atsushi Kawakita, Miyoshi (JP); Masahiro Nakata, Toyota (JP); Junichi Okura, Seto (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 147 days.

(21) Appl. No.: 14/891,105

(22) PCT Filed: May 8, 2014

(86) PCT No.: PCT/IB2014/000738
§ 371 (c)(1),
(2) Date: Nov. 13, 2015

(87) PCT Pub. No.: WO2014/184642
PCT Pub. Date: Nov. 20, 2014

(65) Prior Publication Data

US 2016/0114424 A1 Apr. 28, 2016

(30) Foreign Application Priority Data

May 13, 2013 (JP) ................................ 2013-101046

(51) Int. Cl.
*B23K 26/03* (2006.01)
*B23K 26/00* (2014.01)
(Continued)

(52) U.S. Cl.
CPC .......... *B23K 26/03* (2013.01); *B23K 26/0006* (2013.01); *B23K 26/0066* (2013.01);
(Continued)

(58) Field of Classification Search
CPC .. B23K 26/03; B23K 26/361; B23K 26/0006; B23K 26/0869; B23K 26/16;
(Continued)

(56) References Cited

U.S. PATENT DOCUMENTS 4,167,662 A * 9/1979 Steen .................. B23K 9/0675 219/121.64
5,504,303 A * 4/1996 Nagy ................ B23K 26/0075 219/121.68

(Continued)

FOREIGN PATENT DOCUMENTS

CN 1716544 A 1/2006
CN 101678503 A 3/2010

(Continued)

OTHER PUBLICATIONS

International Search Report dated Nov. 5, 2014 in PCT/IB2014/000738 filed May 8, 2014.

*Primary Examiner* — Mark Paschall
(74) *Attorney, Agent, or Firm* — Oblon, McClelland, Maier & Neustadt, L.L.P.

(57) ABSTRACT

A laser surface treatment method for treating a surface of a workpiece having an irregular shape includes radiating a laser so that the surface of the workpiece which is placed in a direction forming an acute angle with respect to the laser becomes an untreated plane. The method also includes scanning with the laser so that the surface of the workpiece which is placed in the direction forming an acute angle with respect to the laser becomes an untreated plane.

12 Claims, 13 Drawing Sheets

1
10
11
2
3
4
5

(51) Int. Cl.

| | |
|---|---|
| ***C21D 1/09*** | (2006.01) |
| ***B23K 26/08*** | (2014.01) |
| ***B23K 26/16*** | (2006.01) |
| ***B23K 26/362*** | (2014.01) |
| ***B23K 26/361*** | (2014.01) |
| *C21D 9/46* | (2006.01) |
| *B23K 101/18* | (2006.01) |
| *B23K 103/00* | (2006.01) |

(52) U.S. Cl.
CPC .......... *B23K 26/0869* (2013.01); *B23K 26/16* (2013.01); *B23K 26/361* (2015.10); *B23K 26/362* (2013.01); *C21D 1/09* (2013.01); *B23K 2201/18* (2013.01); *B23K 2203/50* (2015.10); *C21D 9/46* (2013.01); *C21D 2221/00* (2013.01); *C21D 2221/10* (2013.01)

(58) Field of Classification Search
CPC .......... B23K 2203/50; B23K 2201/118; C21D 1/09; C21D 2221/00; C21D 2221/10; D21D 9/46
USPC ............... 219/121.69, 121.73, 121.8, 121.78
See application file for complete search history.

(56) References Cited

U.S. PATENT DOCUMENTS 5,855,149 A 1/1999 Islam et al.
6,084,202 A * 7/2000 Okazaki ............ B23K 26/0069 219/121.61
2003/0168437 A1 9/2003 Tanaka
2005/0277270 A1 * 12/2005 Yoshikawa ............ B23K 26/16 438/463
2006/0108330 A1 5/2006 Lee et al.
2007/0245956 A1 * 10/2007 Ruuttu ................ C23C 14/0611 118/620
2008/0210675 A1 9/2008 Sasaki et al.
2010/0167076 A1 7/2010 Nishida et al.
2012/0211475 A1 8/2012 Oswald et al.
2013/0161301 A1 6/2013 Okabe et al.
2016/0114424 A1 4/2016 Hisada et al.

FOREIGN PATENT DOCUMENTS

| | | | |
|---|---|---|---|
| JP | 57-090130 | A | 6/1982 |
| JP | 6-170571 | A | 6/1994 |
| JP | 6-297168 | A | 10/1994 |
| JP | 7 308789 | | 11/1995 |
| JP | 2006 142379 | | 6/2006 |
| JP | 2007 167936 | | 7/2007 |
| JP | 2008 114252 | | 5/2008 |
| JP | 2009-293078 | A | 12/2009 |
| JP | 2010 28128 | | 2/2010 |
| JP | 4696592 | | 6/2011 |
| JP | 2012 12661 | | 1/2012 |
| JP | 2013 18036 | | 1/2013 |
| JP | 2013 116478 | | 6/2013 |
| JP | 6070403 | B2 | 2/2017 |
| KR | 10-2010-0007955 | A | 1/2010 |
| KR | 10 2012 0089975 | | 8/2012 |

* cited by examiner

COMPARATIVE EXAMPLE

PRESENT INVENTION

PRESENT INVENTION 1

PRESENT INVENTION 2

COMPARATIVE EXAMPLE 1

COMPARATIVE EXAMPLE 2

DEFINE SHAPE OF TREATING REGION
SURFACE TREATMENT ON WORKPIECE
NO ATTACHMENT OF SCATTERS
MOVING DIRECTION OF WORKPIECE

LASER SURFACE TREATMENT METHOD AND LASER SURFACE TREATMENT APPARATUS WITH RADIATING THE SURFACE TO BE TREATED ALONG AN ACUTE ANGLE

BACKGROUND OF THE INVENTION

1. Field of the Invention

The present invention relates to a laser surface treatment method and a laser surface treatment apparatus.

2. Description of Related Art

Japanese Patent Application Publication No. 2008-114252 (JP 2008-114252 A) describes a technique to suck out, from a suction port, scatters caused in laser machining so as to prevent the scatters from being attached to a machining target object.

However, in the technique described in JP 2008-114252 A, in a case where a surface treatment is performed on a machining target object having an irregular shape, the suction port cannot be brought close around a machining region of the machining target object and a laser cannot be perpendicularly radiated to a surface of the machining target object in some cases. In view of this, in the technique described in JP 2008-114252 A, there is a possibility that scatters cannot be sucked out sufficiently and the scatters hit that region of the machining target object which has been machined, so as to be attached thereto. That is, the technique described in JP 2008-114252 A has such a possibility that the surface treatment cannot be performed successfully on a workpiece (the machining target object).

SUMMARY OF THE INVENTION

The present invention is accomplished in view of the above problems, and provides a laser surface treatment method and a laser surface treatment apparatus each of which is able to successfully perform a surface treatment on a workpiece without leaving any scatters attached to a surface of the workpiece by radiating a laser to perform scanning so that the surface of the workpiece (a machining target object) which is placed in a direction forming an acute angle with respect to the laser becomes an untreated plane.

A laser surface treatment method according to one aspect of the present invention is a laser surface treatment method for treating a surface of a workpiece having an irregular shape, and the laser surface treatment method includes: a step of radiating a laser so that the surface of the workpiece which is placed in a direction forming an acute angle with respect to the laser becomes an untreated plane; and a step of performing scanning with the laser so that the surface of the workpiece which is placed in the direction forming an acute angle with respect to the laser becomes an untreated plane. This makes it possible to successfully perform a surface treatment on the workpiece without leaving scatters attached to the surface of the workpiece.

The laser surface treatment method may further include a step of calculating an angle formed between the laser and the surface of the workpiece, so that the scanning with the laser may be performed based on a calculation result thereof.

The laser surface treatment method may perform a surface treatment in order, with sectioning the surface of the workpiece into first and second treating regions adjacent to each other, and may define shapes of the first and second treating regions so that an angle formed between the laser and the first treating region is a right angle or an obtuse angle at a time when the laser is radiated to around a border of the second treating region with respect to the first treating region that has been already subjected to the surface treatment.

The shapes of the first and second treating regions may be defined based on a relative speed of the workpiece to a scanner radiating the laser, the workpiece moving such that surface treatment start positions of the first and second treating regions come to the same position.

A surface of a component formed from a hot stamp material may be treated as the surface of the workpiece.

A laser surface treatment apparatus according to one aspect of the present invention is a laser surface treatment apparatus that treats a surface of a workpiece having an irregular shape, and the laser surface treatment apparatus includes: a scanner radiating a laser; and a control section controlling radiation and scanning with the laser so that the surface of the workpiece which is placed in a direction forming an acute angle with respect to the laser becomes an untreated plane. This makes it possible to successfully perform a surface treatment on the workpiece without leaving scatters attached to the surface of the workpiece.

The control section may calculate an angle formed between the laser and the surface of the workpiece, and control the scanning with the laser based on a calculation result thereof.

The laser surface treatment apparatus includes the control section, the control section may perform a surface treatment in order, with sectioning the surface of the workpiece into first and second treating regions adjacent to each other, and the control section may define shapes of the first and second treating regions so that an angle formed between the laser and the first treating region is a right angle or an obtuse angle at a time when the laser is radiated to around a border of the second treating region with respect to the first treating region that has been already subjected to the surface treatment.

The control section may define the shapes of the first and second treating regions based on a relative speed of the workpiece to the scanner radiating the laser, the workpiece moving such that surface treatment start positions of the first and second treating regions come to the same position.

A surface of a component formed from a hot stamp material may be treated as the surface of the workpiece.

According to the present invention, it is possible to provide a laser surface treatment method and a laser surface treatment apparatus each of which is able to successfully perform a surface treatment on a workpiece without leaving scatters attached to a surface of the workpiece by radiating a laser to perform scanning so that the surface of the workpiece (a machining target object) which is placed in a direction forming an acute angle with respect to the laser becomes an untreated plane.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

The following describes concrete embodiments to which the present invention is applied with reference to the drawings. However, the present invention is not limited to the following embodiments. Further, the following description and drawings are simplified appropriately for clarification of the description.

Embodiment 1

Figure 1:
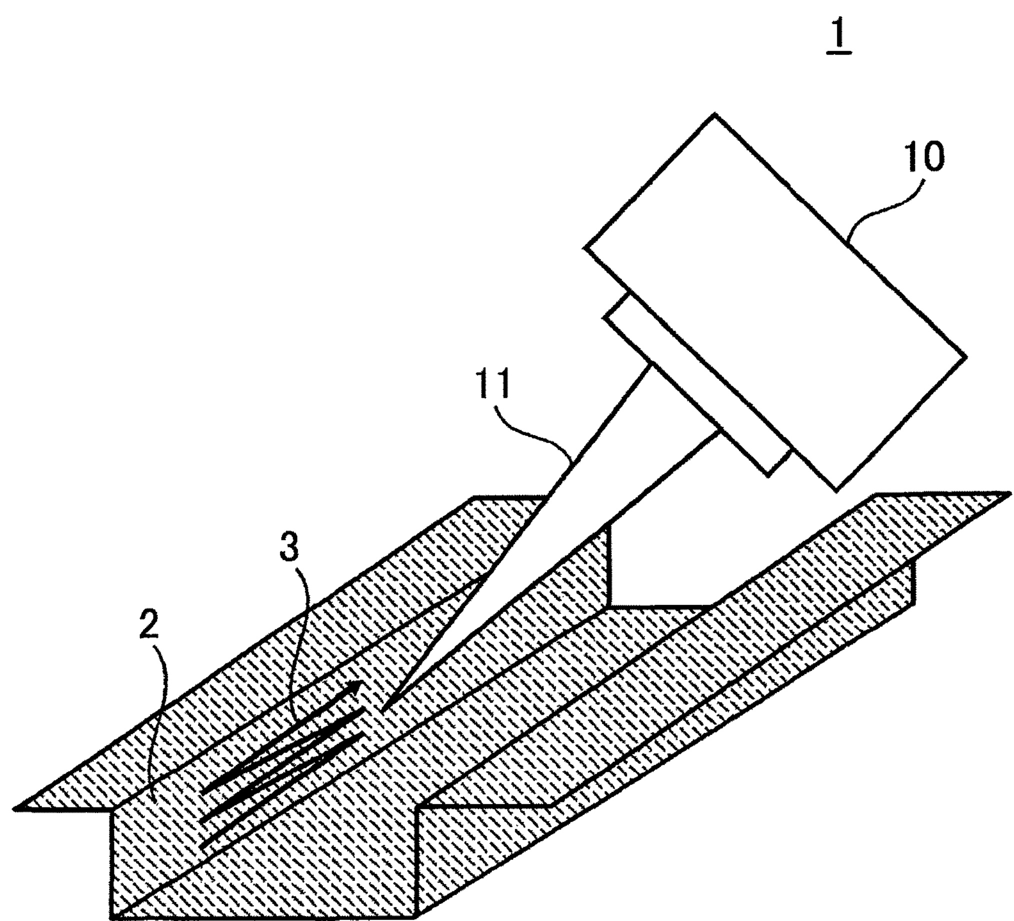
FIG. 1 is a view illustrating a laser surface treatment apparatus according to Embodiment 1 and a workpiece thereof.

FIG. 1 is a view illustrating a laser surface treatment apparatus 1 according to Embodiment 1 and a workpiece 2 thereof. The laser surface treatment apparatus 1 according to the present embodiment radiates a laser to perform scanning so that the surface of a workpiece (a machining target object) which is placed in a direction forming an acute angle with respect to the laser becomes an untreated plane, thereby making it possible to successfully perform a surface treatment on the workpiece without leaving scatters attached to the surface of the workpiece. The following describes the laser surface treatment apparatus 1 more specifically.

The laser surface treatment apparatus 1 illustrated in FIG. 1 includes a scanner 10 that radiates a laser 11 to a surface of the workpiece 2, and a control section (not shown) that controls the scanner 10. The control section controls, for example, a radiation direction of the laser 11 from the scanner 10, and a scanning path 3 of the laser 11 from the scanner 10. Further, the control section calculates an angle formed between the laser 11 and the surface of the workpiece 2, and controls the scanning path 3 of the laser 11 from the scanner 10 based on a calculation result thereof. For example, the control section calculates an angle formed between the laser 11 and the surface of the workpiece 2, and moves the laser 11 little by little to a direction where the angle thus formed becomes an acute angle or a right angle, based on the calculation result.

The workpiece 2 is, for example, a hot stamp material formed by heating a steel sheet, and an oxide film is formed on a surface thereof. The laser surface treatment apparatus 1 removes the oxide film by performing scanning by radiating the laser 11 to the surface of the hot stamp material as the workpiece 2.

Further, the workpiece 2 is applied, for example, to a part (a rocker or the like) of a vehicle, and therefore, the workpiece 2 has an irregular shape (a three-dimensional shape) suitable for the vehicle. In view of this, the laser surface treatment apparatus 1 cannot perpendicularly radiate the laser 11 to the surface of the workpiece 2 in some cases. In this case, scatters of the oxide film removed by the laser 11 hit that surface of the workpiece 2 which is placed in an acute-angle direction with respect to the laser 11, so as to be attached thereto. Note that, with respect to an obtuse-angle direction with respect to the laser 11, the scatters fly off, but do not strike out at the workpiece 2. On that account, even if the scatters fall on the workpiece 2 in the obtuse-angle direction with respect to the laser 11, they are not attached thereto.

Figure 2:
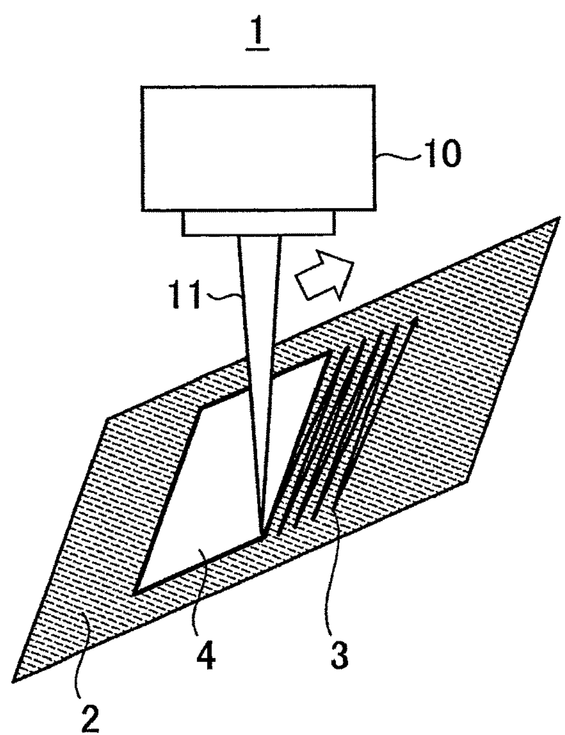
FIG. 2 is a view to describe a laser surface treatment method according to Embodiment 1.
Figure 3:
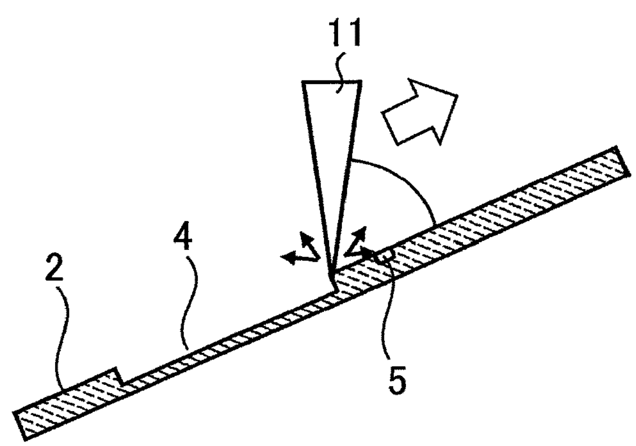
FIG. 3 is a sectional view to describe the laser surface treatment method according to Embodiment 1.

With reference to FIGS. 2 and 3, a laser surface treatment method according to Embodiment 1 is described below. FIG. 2 is a view to describe the laser surface treatment method according to Embodiment 1. FIG. 3 is a sectional view to describe the laser surface treatment method according to Embodiment 1.

In an example of FIGS. 2 and 3, the laser surface treatment apparatus 1 radiates the laser 11 so that the surface of the workpiece 2 which is placed in a direction forming an acute angle with respect to the laser 11 becomes an untreated plane. Further, the laser surface treatment apparatus 1 performs scanning with the laser 11 by setting the scanning path 3 so that the surface of the workpiece 2 which is placed in the direction forming an acute angle with respect to the laser 11 becomes an untreated plane.

More specifically, in the example of FIGS. 2 and 3, the laser surface treatment apparatus 1 performs a surface treatment on the workpiece 2 in such a manner that, while performing scanning with the laser 11 at a given amplitude in two directions (front and rear directions in a plane of paper) on the surface of the workpiece 2 which directions are at right angles to the laser 11, the laser surface treatment apparatus 1 moves the laser 11 little by little in one direction (in an upper-right direction in the plane of paper) on the surface of the workpiece 2 which direction forms an acute angle with respect to the laser 11. At this time, the control section provided in the laser surface treatment apparatus 1 calculates an angle formed between the laser 11 and the surface of the workpiece 2, and performs the scanning with the laser 11 based on a calculation result thereof, as described above.

Hereby, scatters 5 of the oxide film removed by the laser 11 hit only the untreated plane (that surface of the workpiece 2 which is placed in the direction forming an acute angle with respect to the laser 11) of the workpiece 2 so as to be attached thereto, and the scatters 5 do not hit a treated plane 4 of the workpiece 2 (that surface of the workpiece 2 which is placed in a direction forming an obtuse angle with respect to the laser 11) and are not attached thereto. The scatters 5 attached to the untreated plane of the workpiece 2 are subjected to the surface treatment by the laser 11 sometime soon. As a result, the laser surface treatment method according to the present embodiment is able to successfully perform the surface treatment on the workpiece 2 without leaving any scatters 5 attached to the surface of the workpiece 2.

(Laser Surface Treatment Method According to Concept Before Embodiment 1 is Conceived)

Figure 4:
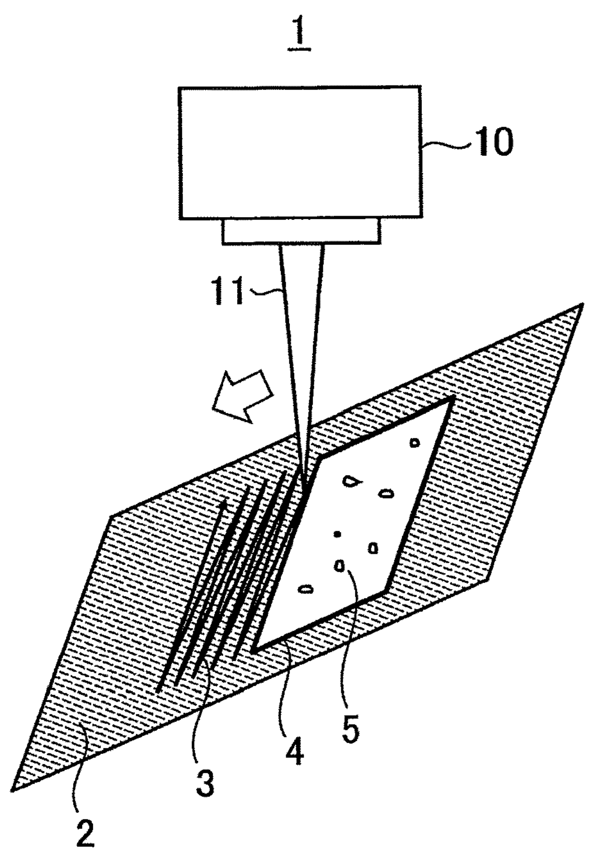
FIG. 4 is a view to describe a laser surface treatment method according to a concept before Embodiment 1 is conceived.
Figure 5:
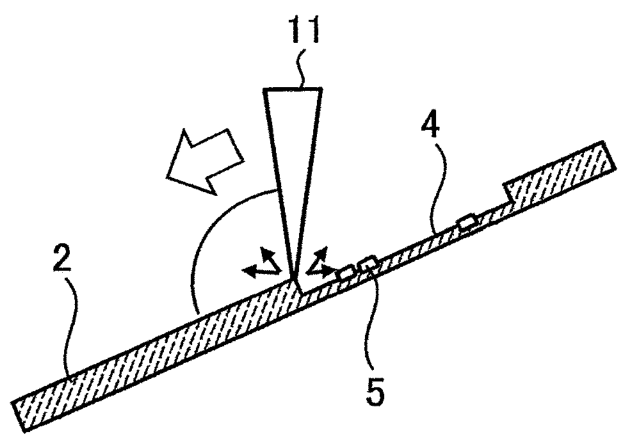
FIG. 5 is a sectional view to describe the laser surface treatment method according to the concept before Embodiment 1 is conceived.

Next will be described a laser surface treatment method according to a concept before Embodiment 1 is conceived, with reference to FIGS. 4 and 5, as a comparative example with respect to FIGS. 2 and 3. FIG. 4 is a view to describe the laser surface treatment method according to the concept before Embodiment 1 is conceived. FIG. 5 is a sectional view to describe the laser surface treatment method according to the concept before Embodiment 1 is conceived.

In the example of FIGS. 4 and 5, a laser surface treatment apparatus 1 performs a surface treatment on a workpiece 2 in such a manner that: while performing scanning with a laser 11 at a given amplitude in two directions (front and rear directions in a plane of paper) on a surface of the workpiece 2 which directions are at right angles to the laser 11, the laser surface treatment apparatus 1 moves the laser 11 little by little in a direction (in an lower-left direction in the plane of paper) on the surface of the workpiece 2 which direction forms an obtuse angle with respect to the laser 11.

Accordingly, scatters 5 of an oxide film removed by the laser 11 hit a treated plane 4 of the workpiece 2 (that surface of the workpiece 2 which is placed in a direction forming an acute angle with respect to the laser 11) so as to be attached thereto. The scatters 5 attached to the treated plane 4 of the workpiece 2 are not subjected to the surface treatment by the laser 11 after that. As a result, the laser surface treatment method according to the concept before the present invention is conceived is not able to remove the scatters 5 attached to the surface of the workpiece 2 so that the surface treatment cannot be performed successfully on the workpiece 2.

Figure 6:
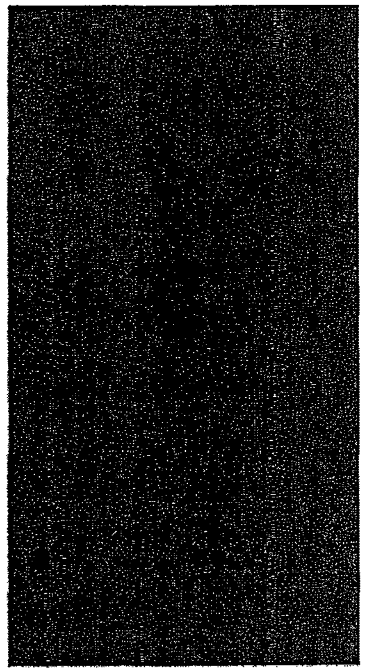
FIG. 6 is plane pictures showing a result by the laser surface treatment method according to Embodiment 1 and a result by the laser surface treatment method according to the concept before Embodiment 1 is conceived.
Figure 6:
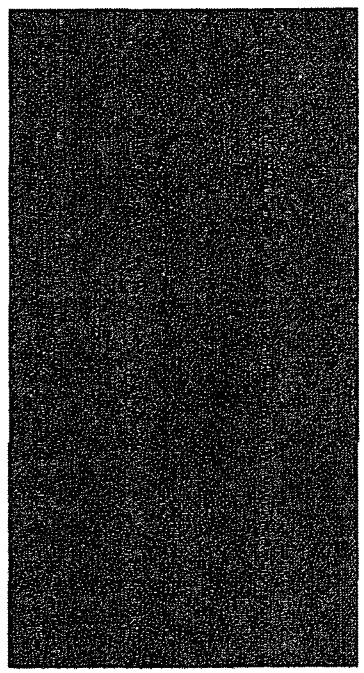

FIG. 6 is plane pictures showing a result (left) by the laser surface treatment method according to Embodiment 1 and a result (right) by the laser surface treatment method according to the concept before Embodiment 1 is conceived. From FIG. 6, it is found that the result by the laser surface treatment method according to Embodiment 1 exhibits an excellent result without any unevenness in comparison with the result by the laser surface treatment method according to the concept before Embodiment 1 is conceived.

(Modified Embodiment of Laser Surface Treatment Method According to Embodiment 1)

Figure 7:
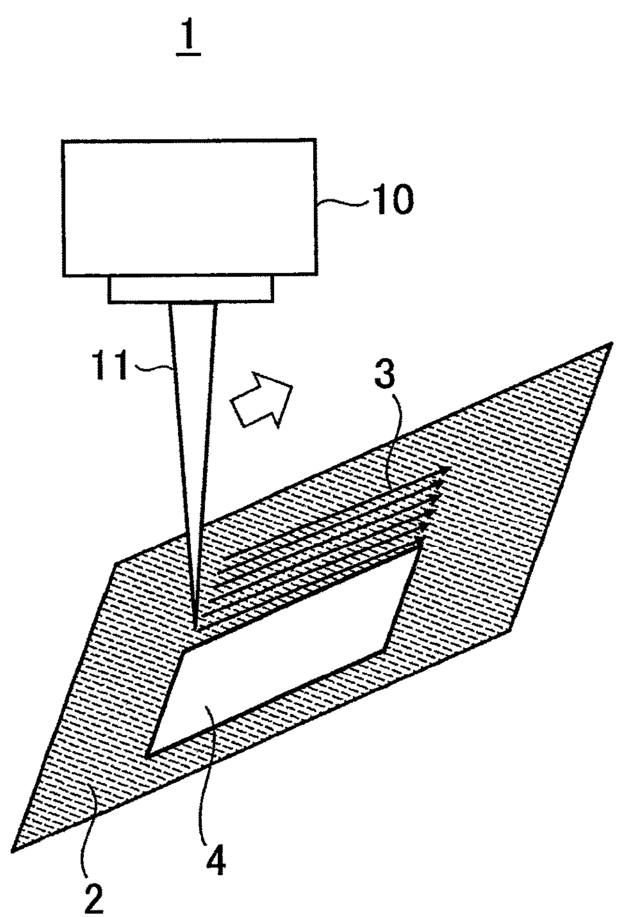
FIG. 7 is a view to describe a modified embodiment of the laser surface treatment method according to Embodiment 1.

FIG. 7 is a view illustrating a modified embodiment of the laser surface treatment method according to Embodiment 1.

In an example of FIG. 7, the laser surface treatment apparatus 1 performs a surface treatment on the workpiece 2 in such a manner that: while moving a radiation start position of the laser 11 little by little in one direction (in a rear direction in a plane of paper) on a surface of the workpiece 2 which direction is at a right angle with respect to the laser 11, the laser surface treatment apparatus 1 performs scanning with the laser 11 repeatedly at a given width in one direction (an upper-right direction in the plane of paper) on the surface of the workpiece 2 which direction forms an acute angle with respect to the laser 11.

Hereby, scatters 5 of an oxide film removed by the laser 11 hit only an untreated plane of the workpiece 2 (that surface of the workpiece 2 which is placed in the direction forming an acute angle with respect to the laser 11) so as to be attached thereto, and the scatters 5 do not hit a treated plane 4 of the workpiece 2 (that surface of the workpiece 2 which is placed in the direction at the right angle with respect to the laser 11) and are not attached thereto. The scatters 5 attached to the untreated plane of the workpiece 2 are subjected to the surface treatment by the laser 11 sometime soon. As a result, the modified embodiment of the laser surface treatment method according to the present embodiment is able to successfully perform the surface treatment on the workpiece 2 without leaving any scatters 5 attached to the surface of the workpiece 2.

As such, the laser surface treatment apparatus 1 and its control method according to the present embodiment performs scanning by radiating the laser 11 so that the surface of the workpiece 2 which is placed in a direction forming an acute angle with respect to the laser 11 becomes an untreated plane, thereby making it possible to successfully perform the surface treatment on the workpiece 2 without leaving any scatters 5 attached to the surface of the workpiece 2.

Embodiment 2

The present embodiment deals with a case where a laser surface treatment apparatus 1 performs a treatment on a surface of a workpiece 2 having a recessed R-shape. More specifically, the present embodiment deals with a case where the laser surface treatment apparatus 1 performs a treatment on that surface of the workpiece 2 which has a planar face A1, a planar face A2, and an R portion at a R-shaped corner at which the planar faces A1, A2 intersect with each other.

(First Laser Surface Treatment Method According to Embodiment 2)

Figure 8:
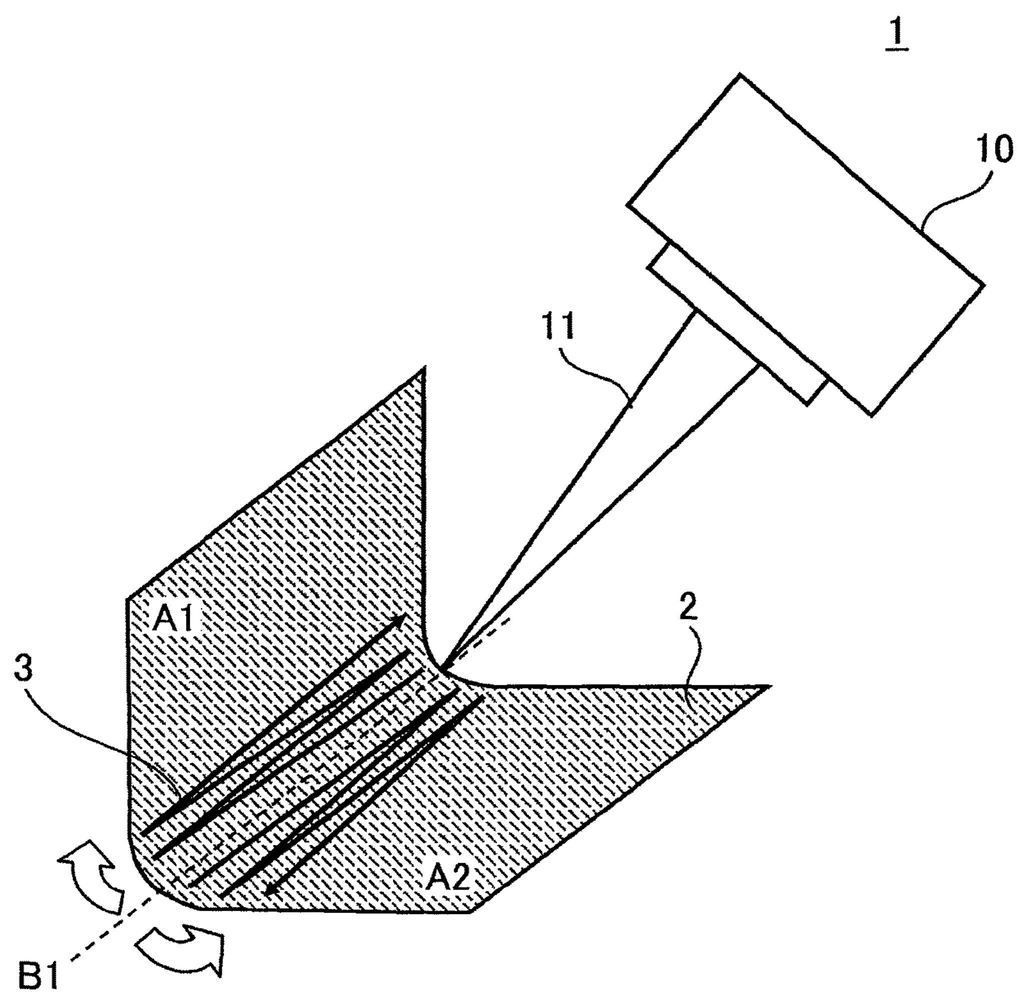
FIG. 8 is a view to describe a first laser surface treatment method according to Embodiment 2.

FIG. 8 is a view to describe a first laser surface treatment method according to Embodiment 2.

Initially, the laser surface treatment apparatus 1 performs a surface treatment on a part of the R portion and the planar face A1 of the workpiece 2 in such a manner that: while performing, from an axis B1 passing through around a center of the R portion, scanning with a laser 11 at a given amplitude in two directions (front and rear directions in a plane of paper) on a surface of a workpiece 2 which directions are at right angles to the laser 11, the laser surface treatment apparatus 1 moves the laser 11 little by little toward the planar face A1 (in an upper direction in the plane of paper) in one direction on the surface of the workpiece 2 which direction forms an acute angle with respect to the laser 11.

Then, the laser surface treatment apparatus 1 performs the surface treatment on the remaining part of the R portion and the planar face A2 of the workpiece 2 in such a manner that: while performing, from the axis B1 passing through around the center of the R portion, scanning with the laser 11 at a given amplitude in two directions (the front and rear directions in the plane of paper) on the surface of the workpiece 2 which directions are at right angles to the laser 11, the laser surface treatment apparatus 1 moves the laser 11 little by little toward the planar face A2 (in a right direction in the plane of paper) in one direction on the surface of the workpiece 2 which direction forms an acute angle with respect to the laser 11.

Hereby, scatters 5 of an oxide film removed by the laser 11 hit only an untreated plane of the workpiece 2 (that surface of the workpiece 2 which is placed in the direction forming an acute angle with respect to the laser 11) so as to be attached thereto, and the scatters 5 do not hit a treated plane of the workpiece 2 (that surface of the workpiece 2 which is placed in a direction forming an obtuse angle with respect to the laser 11) and are not attached thereto. The scatters 5 attached to the untreated plane of the workpiece 2 are subjected to the surface treatment by the laser 11 sometime soon. As a result, the first laser surface treatment method according to the present embodiment is able to successfully perform the surface treatment on the workpiece 2 without leaving any scatters 5 attached to the recessed R-shaped surface of the workpiece 2.

(Second Laser Surface Treatment Method According to Embodiment 2)

Figure 9:
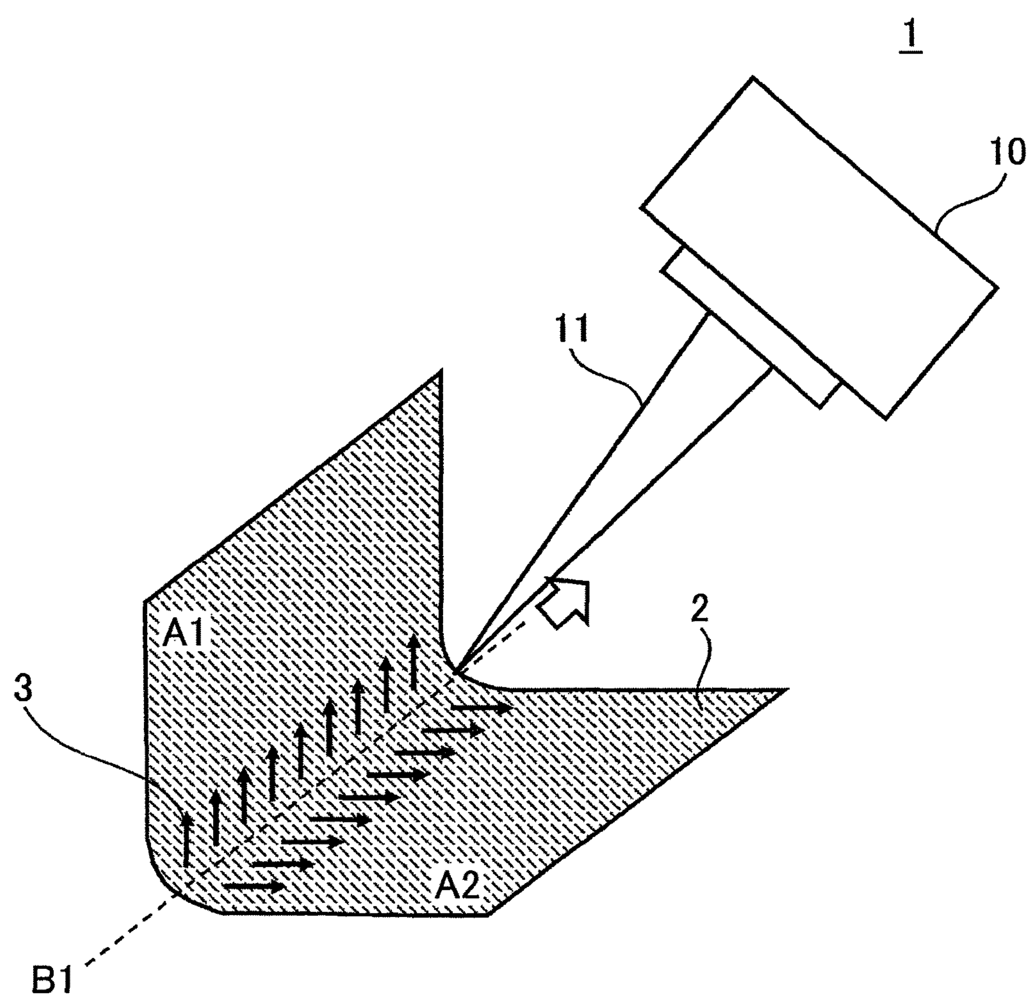
FIG. 9 is a view to describe a second laser surface treatment method according to Embodiment 2.

FIG. 9 is a view to describe a second laser surface treatment method according to Embodiment 2.

Initially, the laser surface treatment apparatus 1 performs a surface treatment on a part of the R portion and the planar face A1 of the workpiece 2 in such a manner that: while moving little by little (in a rear direction in a plane of paper) that radiation start position of the laser 11 which is on the axis B1 passing through around the center of the R portion, the laser surface treatment apparatus 1 repeatedly performs scanning with the laser 11 at a given width toward the planar face A1 (in an upper direction in the plane of paper) in one direction on the surface of the workpiece 2 which direction forms an acute angle with respect to the laser 11.

Subsequently, the laser surface treatment apparatus 1 performs the surface treatment on the remaining part of the R portion and the planar face A2 of the workpiece 2 in such a manner that: while moving little by little (in the rear direction in the plane of paper) that radiation start position of the laser 11 which is on the axis B1 passing through around the center of the R portion, the laser surface treatment apparatus 1 repeatedly performs scanning with the laser 11 at a given width toward the planar face A2 (in a right direction in the plane of paper) in one direction on the surface of the workpiece 2 which direction forms an acute angle with respect to the laser 11.

Hereby, scatters 5 of an oxide film removed by the laser 11 hit only an untreated plane of the workpiece 2 (that surface of the workpiece 2 which is placed in the direction forming an acute angle with respect to the laser 11) so as to be attached thereto, and the scatters 5 do not hit a treated plane of the workpiece 2 (that surface of the workpiece 2 which is placed in a direction at a right angle with respect to the laser 11) and are not attached thereto. The scatters 5 attached to the untreated plane of the workpiece 2 are subjected to the surface treatment by the laser 11 sometime soon. As a result, the second laser surface treatment method according to the present embodiment is able to successfully perform the surface treatment on the workpiece 2 without leaving any scatters 5 attached to the recessed R-shaped surface of the workpiece 2.

(Laser Surface Treatment Method According to Concept Before Embodiment 2 is Conceived)

Figure 10:
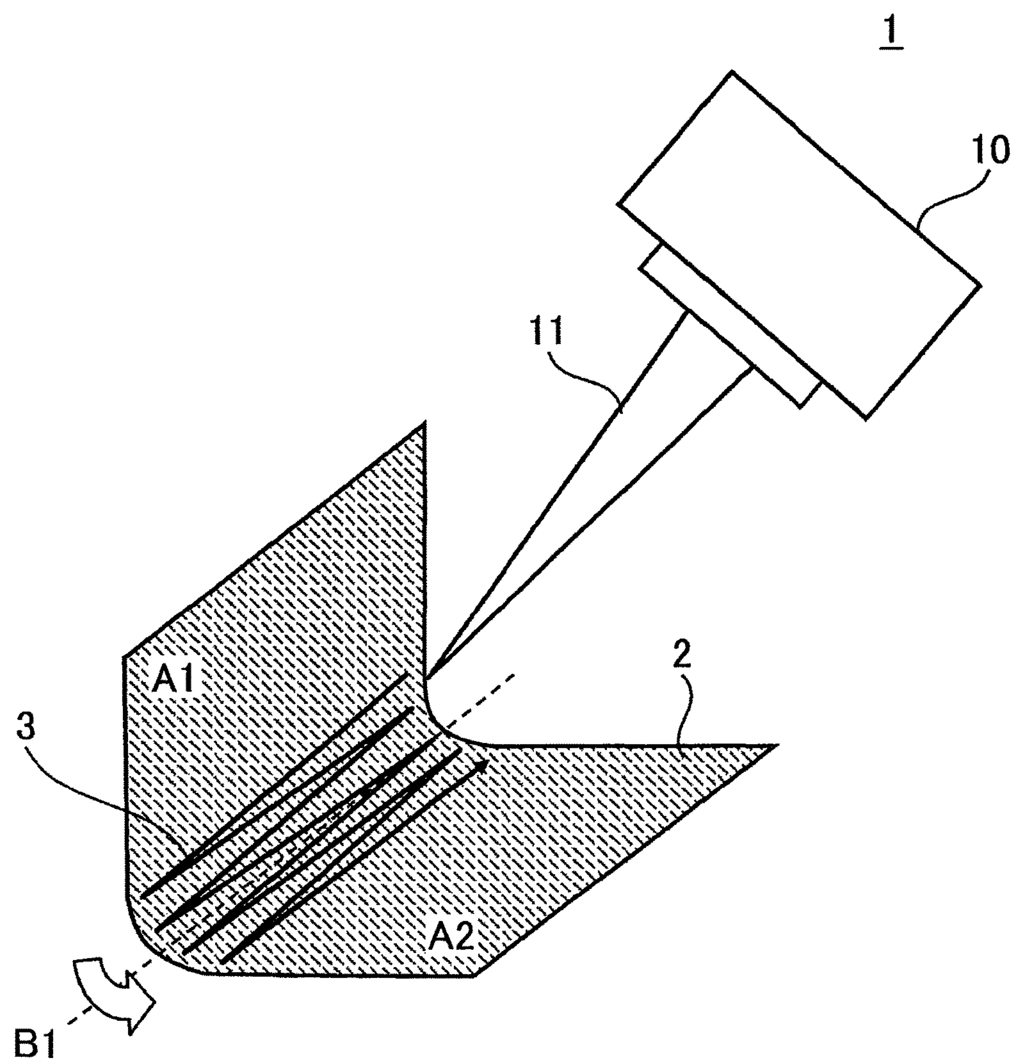
FIG. 10 is a view to describe a first laser surface treatment method according to a concept before Embodiment 2 is conceived.
Figure 11:
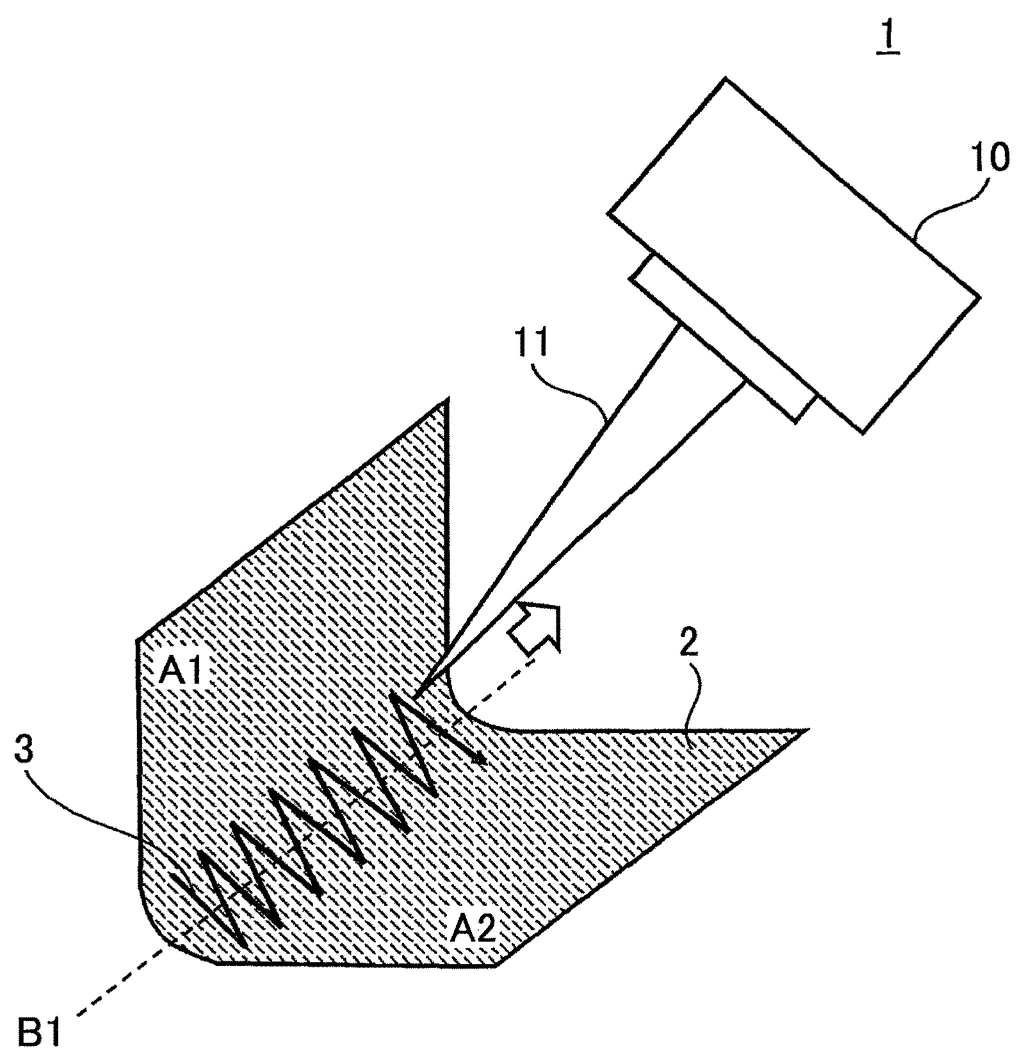
FIG. 11 is a view to describe a second laser surface treatment method according to a concept before Embodiment 2 is conceived.

Next will be described a laser surface treatment method according to a concept before Embodiment 2 is conceived, with reference to FIGS. 10 and 11, as comparative examples with respect to FIGS. 8 and 9. FIG. 10 is a view to describe a first laser surface treatment method according to the concept before Embodiment 2 is conceived. FIG. 11 is a view to describe a second laser surface treatment method according to the concept before Embodiment 2 is conceived.

In the example of FIG. 10, a laser surface treatment apparatus 1 performs a surface treatment on a workpiece 2 in such a manner that: while performing, from a planar face A1, scanning with a laser 11 at a given amplitude in two directions (front and rear directions in a plane of paper) on a surface of the workpiece 2 which directions are at right angles to the laser 11, the laser surface treatment apparatus 1 moves the laser 11 little by little toward a planar face A2 via an R portion.

Accordingly, in the surface treatment from the planar face A1 to the R portion, scatters 5 of an oxide film removed by the laser 11 hit a treated plane of the workpiece 2 (that surface of the workpiece 2 which is placed in a direction forming an acute angle with respect to the laser 11) so as to be attached thereto. As a result, the first laser surface treatment method according to the concept before Embodiment 2 is conceived is not able to remove the scatters 5 attached to the surface of the workpiece 2, and thus cannot perform the surface treatment on the workpiece 2 successfully.

In the example of FIG. 11, the laser surface treatment apparatus 1 performs a surface treatment on the workpiece 2 in such a manner that: while performing scanning with a laser 11 at a given amplitude toward the planar faces A1, A2 around an axis B1 passing through around a center of the R portion, the laser surface treatment apparatus 1 moves the laser 11 little by little in one direction (in a rear direction in a plane of paper) on the surface of the workpiece 2 which direction is at a right angle with respect to the laser 11.

Accordingly, in the surface treatment from the planar face A1 to the R portion and in the surface treatment from the planar face A2 to the R portion, scatters 5 of an oxide film removed by the laser 11 hit a treated plane of the workpiece 2 (that surface of the workpiece 2 which is placed in a direction forming an acute angle with respect to the laser 11) so as to be attached thereto. As a result, the second laser surface treatment method according to the concept before Embodiment 2 is conceived is not able to remove the scatters 5 attached to the surface of the workpiece 2, and thus cannot perform the surface treatment on the workpiece 2 successfully.

Figure 12:
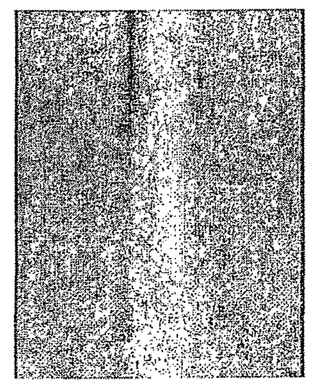
FIG. 12 is plane pictures showing results by the laser surface treatment methods in FIGS. 8, 9, 10, 11.
Figure 12:
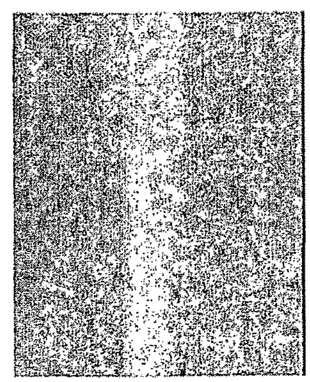
Figure 12:
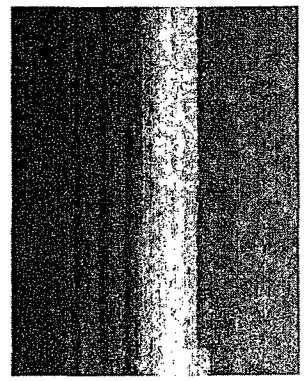
Figure 12:
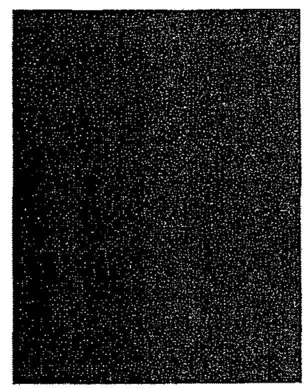

FIG. 12 is plane pictures showing results by the laser surface treatment methods in FIGS. 8, 9, 10, 11. From FIG. 12, it is found that results (the leftmost view and the second view from the left) by the first and second laser surface treatment methods according to Embodiment 2 exhibit excellent results without unevenness in comparison with results (the second view from the right and the rightmost view) by the first and second laser surface treatment methods according the concept before Embodiment 2 is conceived.

Thus, the laser surface treatment apparatus 1 and its control method according to the present embodiment performs scanning by radiating the laser 11 so that the surface of the workpiece 2 which is placed in a direction forming an acute angle with respect to the laser 11 becomes an untreated plane, thereby making it possible to successfully perform the surface treatment on the workpiece 2 without leaving any scatters 5 attached to the recessed R-shaped surface of the workpiece 2. The same can be true to a case where the surface treatment is performed on a workpiece 2 having a projecting R shape or a curved shape.

Embodiment 3

The present embodiment deals with a case where a laser surface treatment apparatus 1 sections a surface of a workpiece 2 into a plurality of treating regions adjacent to each other, and performs a surface treatment in order.

(First Laser Surface Treatment Method According to Embodiment 3)

Figure 13:
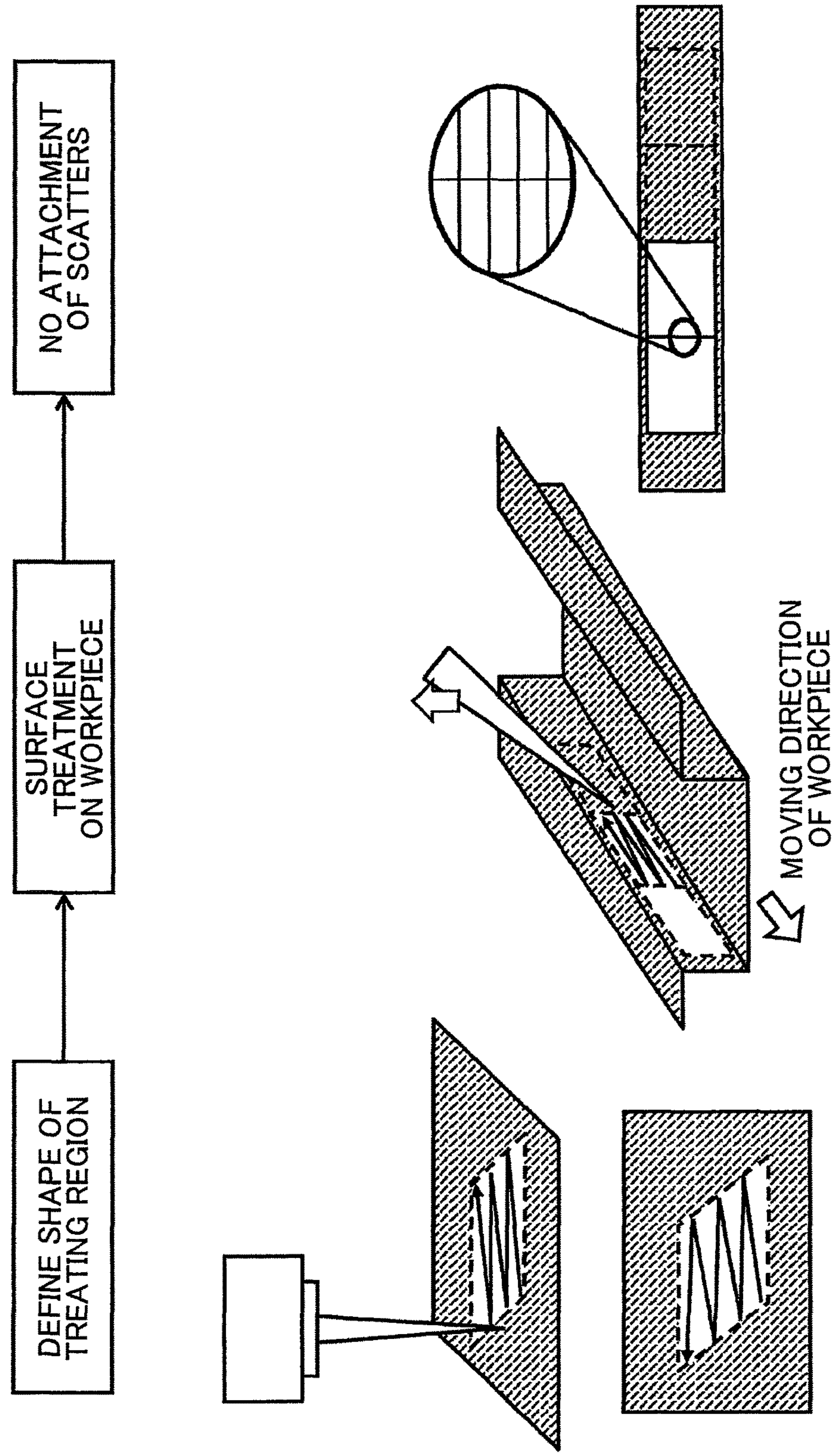
FIG. 13 is a view to describe a first laser surface treatment method according to Embodiment 3.

FIG. 13 is a view to describe a first laser surface treatment method according to Embodiment 3.

Initially, the laser surface treatment apparatus 1 defines a shape of a treating region per unit. In an example of FIG. 13, the laser surface treatment apparatus 1 defines the shape of the treating region per unit as a parallelogram in which a vertex on a bottom right in a plane of paper forms an acute angle. Further, in the example of FIG. 13, the laser surface treatment apparatus 1 performs a surface treatment on the treating region per unit in such a manner that: while performing scanning with a laser 11 at a given amplitude in right and left directions in the plane of paper, the laser surface treatment apparatus 1 moves the laser 11 little by little from a lower side to an upper side in the plane of paper. Hereby, that surface of the workpiece 2 which is placed in a direction forming an acute angle with respect to the laser 11 becomes an untreated plane.

Then, the laser surface treatment apparatus 1 actually performs a surface treatment on the workpiece 2 having an irregular shape. In the example of FIG. 13, the workpiece 2 moves at a predetermined speed (a relative speed to a scanner 10) so that a surface-treatment start position in each treating region comes to the same position. This makes it possible to perform the surface treatment on a plurality of treating regions in succession.

Here, in the example of FIG. 13, since the workpiece 2 (or the scanner 10) moves at a predetermined speed, that parallelogram shape of the treating region which is defined in advance is actually changed into a rectangular shape. Hereby, when the laser 11 is radiated to around a border of a certain treating region (a second treating region) with respect to its previous treating region (a first treating region), an angle formed between the laser 11 and the previous treating region (the first treating region) becomes a right angle, thereby making it possible to restrain scatters 5 from being attached to the workpiece 2 in vicinity to the boundary.

(Second Laser Surface Treatment Method According to Embodiment 3)

Figure 14:
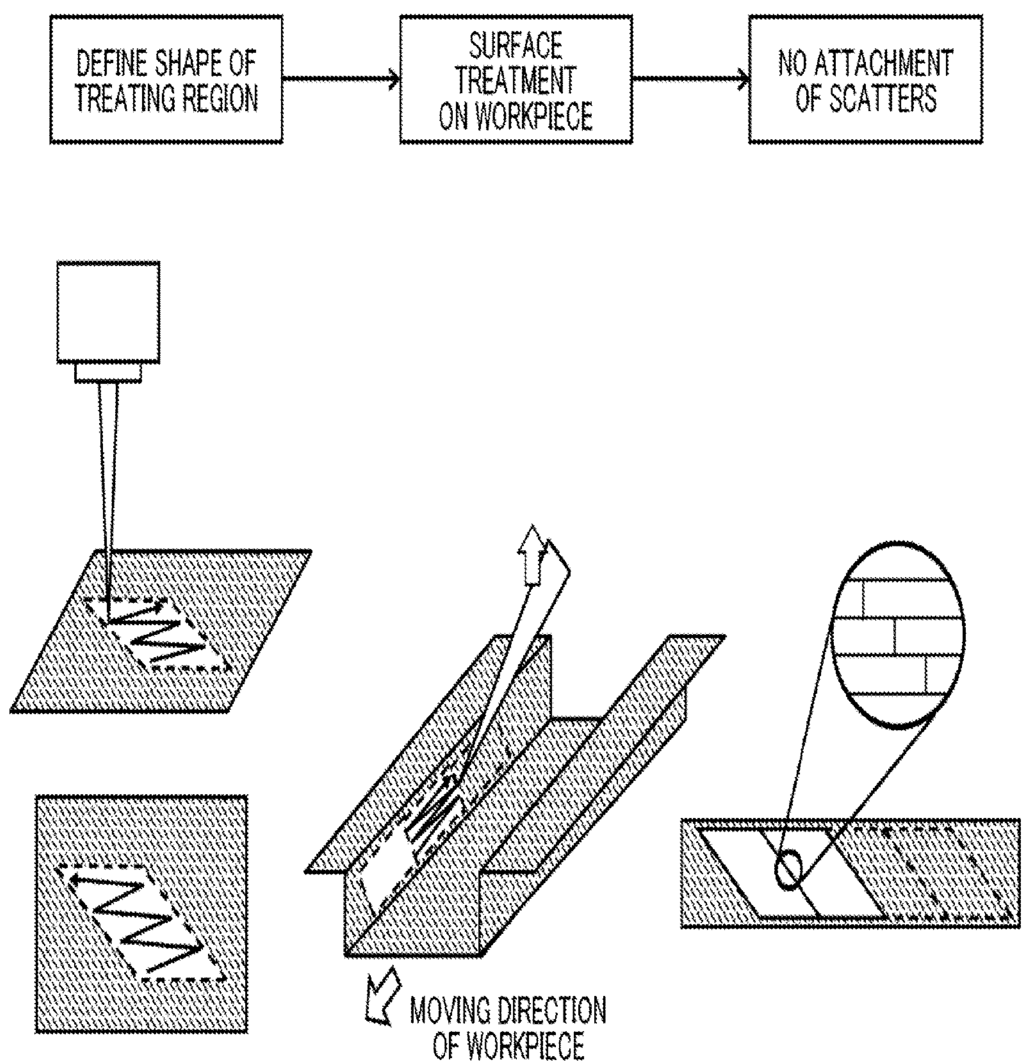
FIG. 14 is a view to describe a second laser surface treatment method according to Embodiment 3.

FIG. 14 is a view to describe a second laser surface treatment method according to Embodiment 3.

Initially, the laser surface treatment apparatus 1 defines a shape of a treating region per unit. In an example of FIG. 14, the laser surface treatment apparatus 1 defines the shape of the treating region per unit as a parallelogram in which a vertex on a bottom right in a plane of paper forms a more acute angle than that of the example of FIG. 13. The other configurations and operations illustrated in FIG. 14 are the same as in the case of FIG. 13, so that descriptions thereof are omitted.

Here, in the example of FIG. 14, since the workpiece 2 (or the scanner 10) moves at a predetermined speed, that parallelogram shape of the treating region which is defined in advance is actually changed into a parallelogram shape in which the vertex on the bottom right in the plane of paper forms a moderate acute angle. Hereby, when the laser 11 is radiated to around a border of a certain treating region (a second treating region) with respect to its previous treating region (a first treating region), an angle formed between the laser 11 and the previous treating region (the first treating region) becomes an obtuse angle, thereby making it possible to restrain scatters 5 from being attached to the workpiece 2 in vicinity to the boundary.

(Laser Surface Treatment Method According to Concept Before Embodiment 3 is Conceived)

Figure 15:
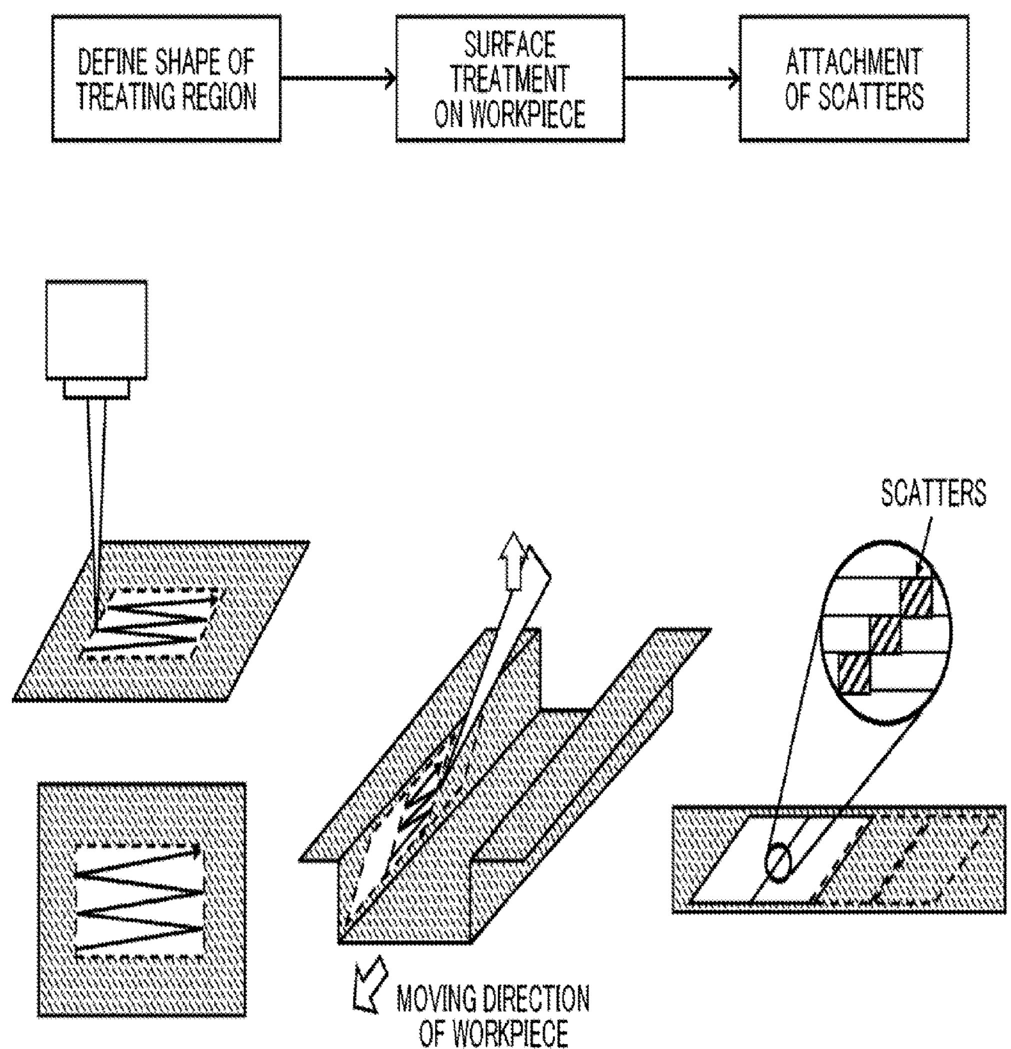
FIG. 15 is a view to describe a laser surface treatment method according to a concept before Embodiment 3 is conceived.

Next will be described a laser surface treatment method according to a concept before Embodiment 3 is conceived, with reference to FIG. 15, as a comparative example with respect to FIGS. 13 and 14. FIG. 15 is a view to describe the laser surface treatment method according to the concept before Embodiment 3 is conceived.

Initially, a laser surface treatment apparatus 1 defines a shape of a treating region per unit. In the example of FIG. 15, the laser surface treatment apparatus 1 defines the shape of the treating region per unit as a rectangular shape. The other configurations and operations illustrated in FIG. 15 are the same as in the case of FIG. 13, so that descriptions thereof are omitted.

Here, in the example of FIG. 15, since a workpiece 2 (or a scanner 10) moves at a predetermined speed, that rectangular shape of the treating region which is defined in advance is actually changed into a parallelogram shape in which a vertex on a bottom right in a plane of paper forms an obtuse angle. Accordingly, when a laser 11 is radiated to around a border of a certain treating region (a second treating region) with respect to its previous treating region (a first treating region), an angle formed between the laser 11 and the previous treating region (the first treating region) becomes an acute angle, thereby making it difficult to restrain scatters 5 from being attached to the workpiece 2 in vicinity to the boundary.

As such, the laser surface treatment apparatus 1 and its control method according to Embodiments 1 to 3 performs scanning by radiating the laser 11 so that the surface of the workpiece 2 which is placed in a direction forming an acute angle with respect to the laser 11 becomes an untreated plane, thereby making it possible to successfully perform a surface treatment on the workpiece 2 without leaving any scatters 5 attached to the surface of the workpiece 2.

Note that the present invention is not limited to the above embodiments, and various modifications can be made within a range which does not deviate from a gist of the present invention. For example, the above exemplary configurations may be used in combination.

The invention claimed is:

1. A laser surface treatment method for treating a workpiece having a three-dimensional shape, the laser surface treatment method comprising:

sectioning a surface of the workpiece to be treated into a plurality of treating region; and performing a surface treatment on the plurality of treating regions in order, the surface treatment including:

radiating a laser on a treating region being treated so that the laser always forms an acute angle with respect to a treating region that has not yet been treated in a range of the treating region being treated, and scanning the laser within the treating region being treated so that the laser always forms the acute angle with respect to the treating region that has not yet been treated in the range of the treating region being treated.

2. The laser surface treatment method according to claim 1, further comprising:

calculating an angle formed between the laser and the surface of the workpiece; and scanning with the laser based on the calculated angle.

3. The laser surface treatment method according to claim 1, wherein:

the plurality of treating regions includes a first treating region and a second treating region adjacent to each other; and the method further comprises defining a shape of the first treating region and a shape of the second treating region so that an angle formed between the laser and the first treating region is a right angle or an obtuse angle at a time when the laser is radiated to around a border of the second treating region with respect to the first treating region that has been already subjected to the surface treatment.

4. The laser surface treatment method according to claim 3, further comprising:

defining the shape of the first treating region and the shape of the second treating region based on a relative speed of the workpiece to a scanner radiating the laser, the workpiece moving such that a surface treatment start position for the first treating region and a surface treatment start position for the second treating region come to the same position.

5. The laser surface treatment method according to claim 1, wherein:

the surface of the workpiece includes a surface of a component formed from a hot stamp material.

6. A laser surface treatment apparatus that treats a workpiece having a three-dimensional shape, the laser surface treatment apparatus comprising:

a scanner radiating a laser; and a controller configured to:

section a surface of the workpiece to be treated into a plurality of treating regions; and control radiation and scanning with the laser so that in a surface treatment on the plurality of treating regions in order, the laser, within a treating region being treated, always forms an acute angle with respect to a treating region that has not yet been treated in a range of the treating region being treated.

7. The laser surface treatment apparatus according to claim 6, wherein:

the controller is configured to calculate an angle formed between the laser and the surface of the workpiece, and control scanning with the laser based on the calculated angle.

8. The laser surface treatment apparatus according to claim 6, wherein:

the plurality of treating regions includes a first treating region and a second treating region adjacent to each other; and the controller is configured to define a shape of the first treating region and a shape of the second treating region so that an angle formed between the laser and the first treating region is a right angle or an obtuse angle at a time when the laser is radiated to around a border of the second treating region with respect to the first treating region that has been already subjected to the surface treatment.

9. The laser surface treatment apparatus according to claim 8, wherein:

the controller is configured to define the shapes of the first and second treating regions based on a relative speed of the workpiece to the scanner radiating the laser, the workpiece moving such that a surface treatment start position of the first treating region and a surface treatment start position of the second treating region come to the same position.

10. The laser surface treatment apparatus according to claim 6, wherein:

the surface of the workpiece includes a surface of a component formed from a hot stamp material.

11. The laser surface treatment method according to claim 1, wherein:

scanning includes moving the laser at a given amplitude in two directions within the treating region being treated.

12. The laser surface treatment apparatus according to claim 6, wherein:

scanning includes moving the laser at a given amplitude in two directions within the treating region being treated.

* * * * *